US010967764B2

(12) United States Patent
Fowler et al.

(10) Patent No.: US 10,967,764 B2
(45) Date of Patent: Apr. 6, 2021

(54) RETENTION DEVICE FOR VEHICLE SEAT

(71) Applicant: Ford Global Technologies, LLC, Dearborn, MI (US)

(72) Inventors: James Hugh Fowler, Novi, MI (US); Marcos Silva Kondrad, Macomb Township, MI (US); Kevin Wayne Preuss, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 16/269,141

(22) Filed: Feb. 6, 2019

(65) Prior Publication Data

US 2020/0247285 A1 Aug. 6, 2020

(51) Int. Cl.
*B60N 2/36* (2006.01)
*B60N 2/30* (2006.01)

(52) U.S. Cl.
CPC ............ *B60N 2/36* (2013.01); *B60N 2/3047* (2013.01)

(58) Field of Classification Search
CPC .......... B60N 2/36; B60N 2/3047; B60N 2/01; B60N 2/242; B60N 2/002
USPC ..................... 296/65.05, 69, 37.15
See application file for complete search history.

(56) References Cited

U.S. PATENT DOCUMENTS

| 3,309,135 A | * | 3/1967 | Jannetto | .................. B60R 7/043 297/188.01 |
| 7,614,689 B2 | * | 11/2009 | Fowler | .................... B60R 7/043 297/188.01 |
| 9,079,516 B2 | * | 7/2015 | Petit | ........................ B60R 7/043 |
| 9,878,673 B2 | * | 1/2018 | Harris | .................... B60R 7/043 |
| 9,975,491 B2 |   | 5/2018 | Morlet Ugalde et al. | |
| 10,131,282 B2 | * | 11/2018 | Huebner | .................. B60N 2/00 |
| 2002/0011505 A1 |   | 1/2002 | Cole et al. | |
| 2006/0022479 A1 |   | 2/2006 | Mulvihill et al. | |
| 2006/0061152 A1 | * | 3/2006 | Pudney | .................... B60R 7/043 297/188.01 |
| 2006/0103186 A1 | * | 5/2006 | Sturt | ...................... B60N 3/103 297/188.1 |
| 2010/0308619 A1 | * | 12/2010 | Hoge | ....................... B60N 2/12 296/65.08 |
| 2013/0229045 A1 |   | 9/2013 | Agustin | |
| 2015/0197200 A1 | * | 7/2015 | Sakarian | ................. B60R 7/043 297/188.11 |

* cited by examiner

Primary Examiner — D Glenn Dayoan
Assistant Examiner — E Turner Hicks
(74) Attorney, Agent, or Firm — David Coppiellie; Price Heneveld LLP

(57) ABSTRACT

A seating assembly is attached to the floor and includes a seat that is rotationally operable relative to a seatback. A retention device is attached to the seat. When the seat is pivoted upright to a stadium position, the retention device is selectively deployable from a stored position to a cargo storage position that defines an enclosure at least partially defined by the seat and the floor.

20 Claims, 16 Drawing Sheets

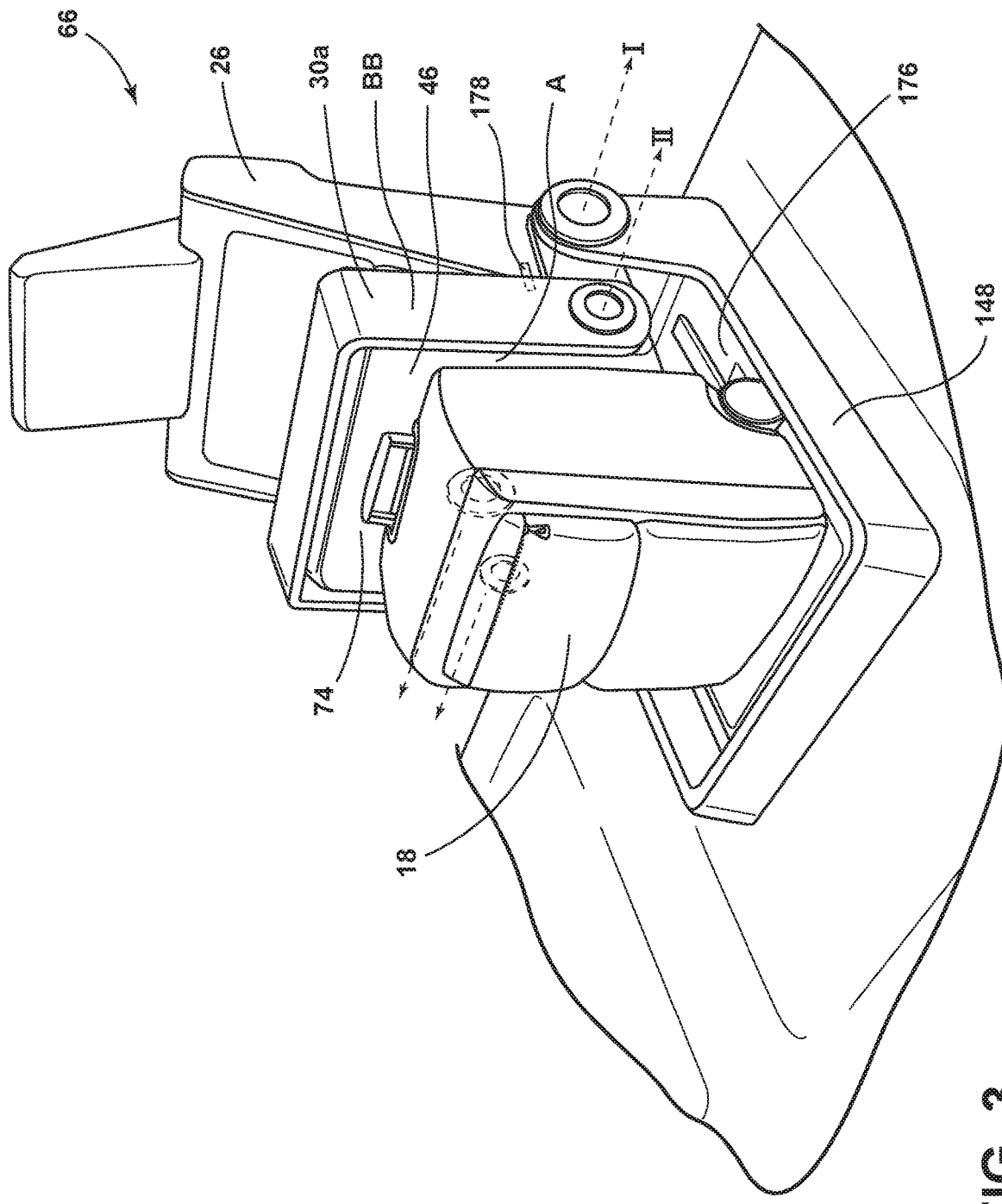

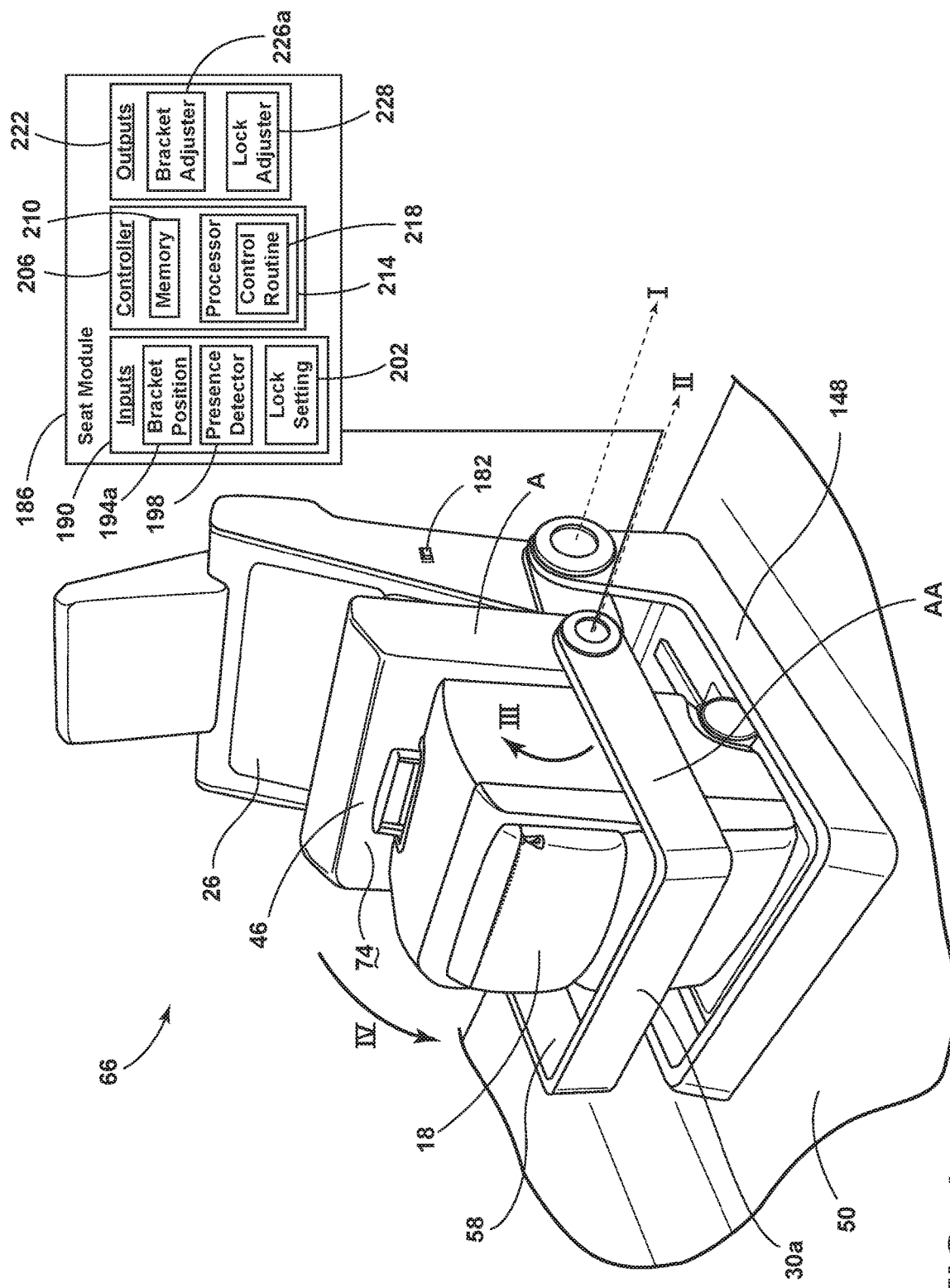

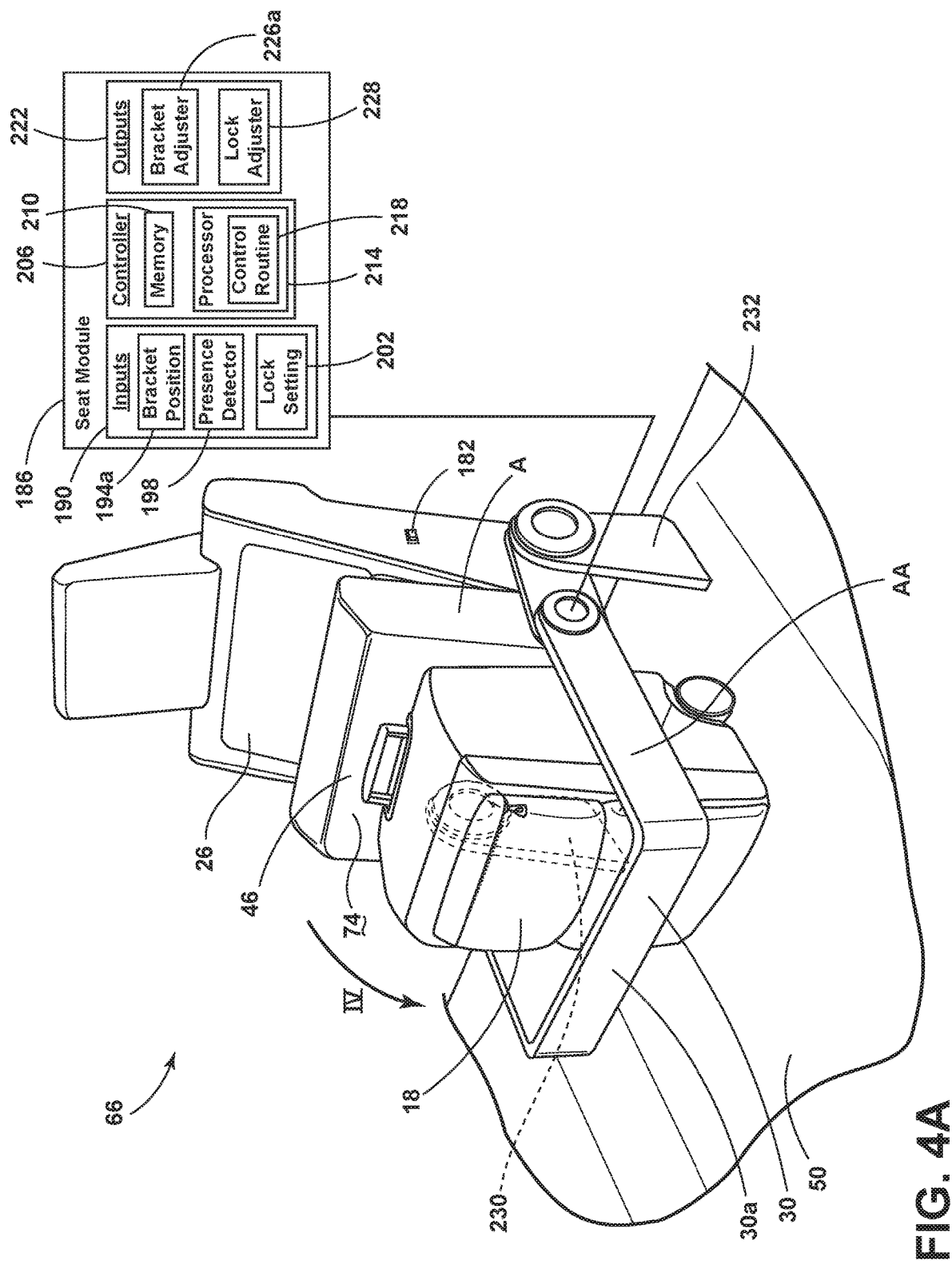

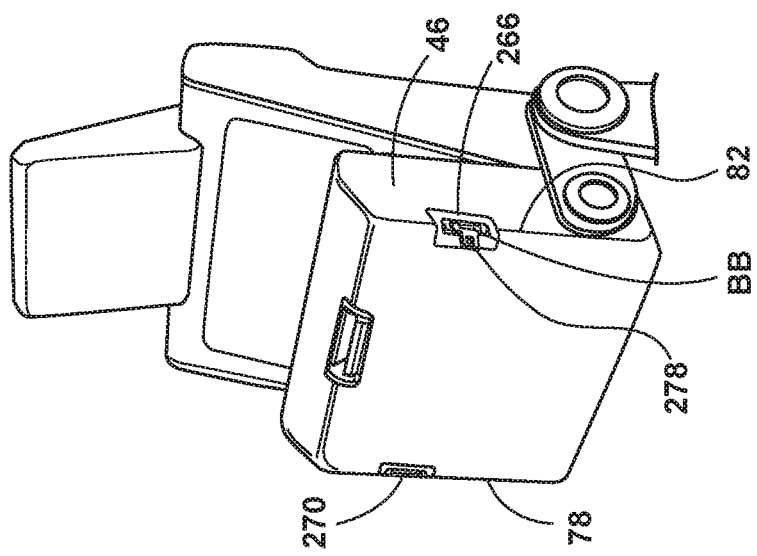
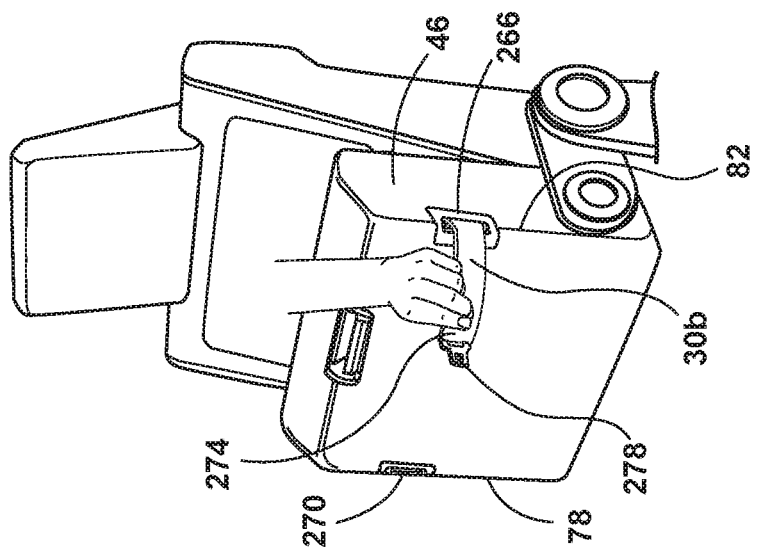

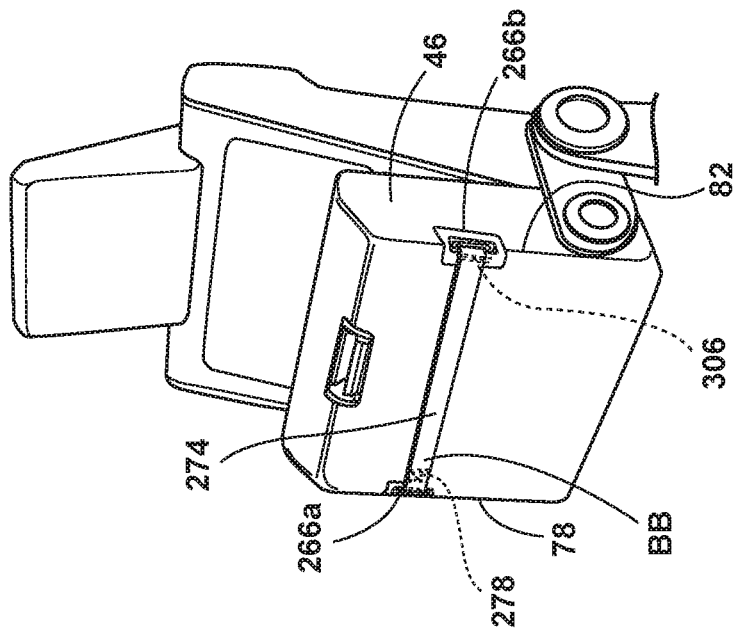
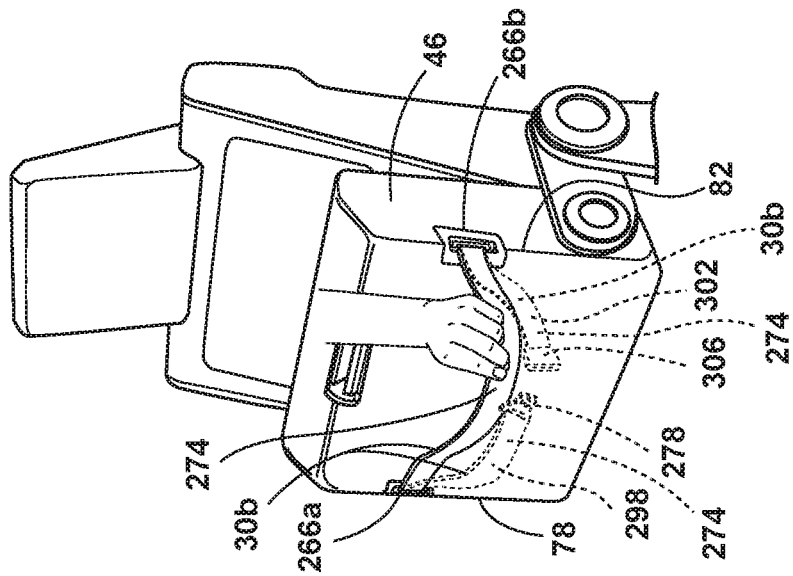

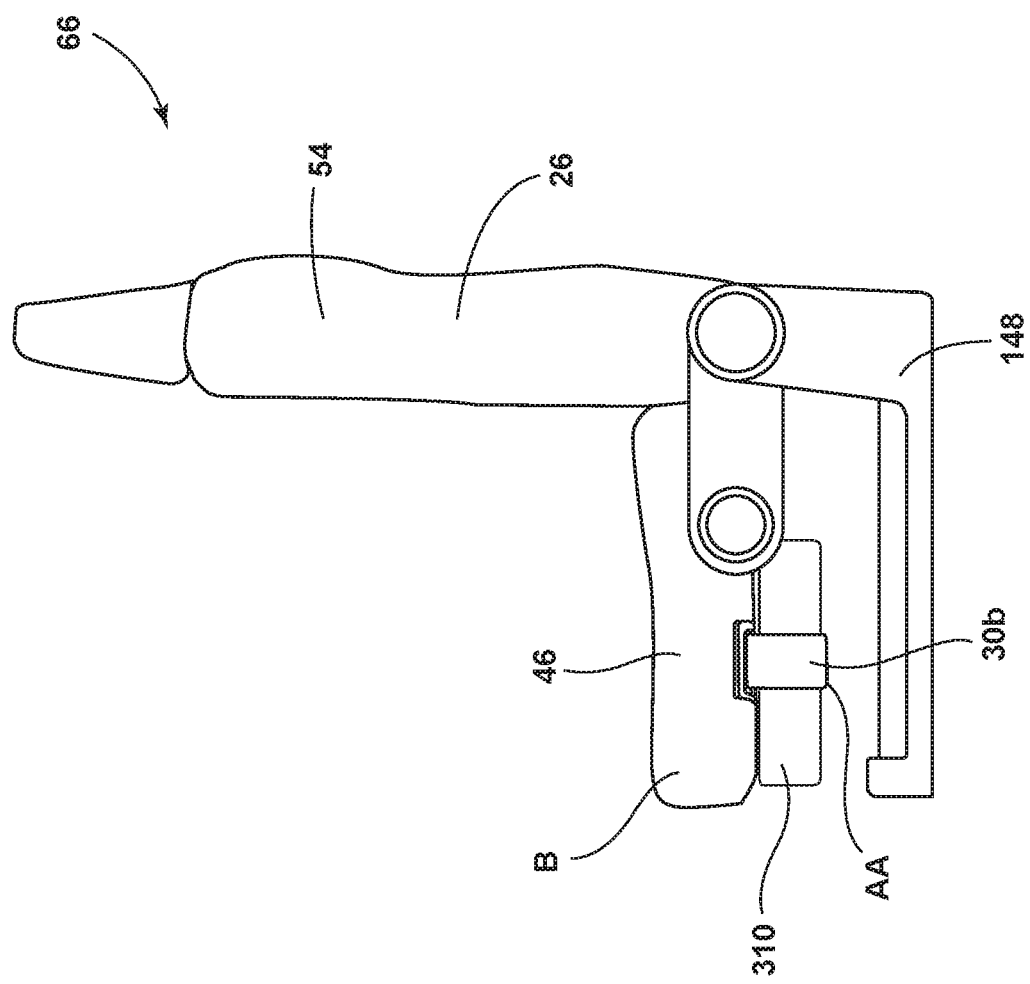

RETENTION DEVICE FOR VEHICLE SEAT

FIELD OF THE INVENTION

The present invention generally relates to selectively deployable storage enclosures, and more specifically to selectively deployable storage enclosures in vehicles.

BACKGROUND OF THE INVENTION

Storage areas in vehicles have become increasingly important as users seek efficient use of vehicle space. Selectively deployable storage options in a vehicle provide multifunctional vehicle space for changing user needs. Further, it is desirable to provide storage options for vehicle cargo that contain the cargo in standard driving conditions, erratic driving conditions, and during collisions.

SUMMARY OF THE INVENTION

According to a first aspect of the present invention, a vehicle includes a floor. A seating assembly is attached to the floor and includes a seat that is rotationally operable relative to a seatback. A retention device is attached to the seat. When the seat is pivoted upright to a stadium position, the retention device is selectively deployable from a stored position to a cargo storage position that defines an enclosure at least partially defined by the seat and the floor.

Embodiments of the first aspect of the invention can include any one or a combination of the following features:
- the retention device is pivotably coupled to the seat at a first attachment point and a second attachment point;
- the retention device comprises a bracket including a first side extending away from the first attachment point and a second side extending away from the second attachment point;
- the bracket includes a third side extending between the first side and the second side;
- a strap extending between the third side of the bracket and the seat when the bracket is in a cargo storage position and when the seat is in the stadium position;
- a retraction mechanism disposed in the seat for receiving the strap when the retention device is in the stored position;
- the strap comprises a first strap and a second strap;
- the strap comprises a ladder-type shape;
- the bracket is disposed about a perimeter portion of the seat when the bracket is in the stored position;
- the retention device is stored in a first side of the seat in a stored position;
- the retention device extends from the first side of the seat to a second side of the seat in a cargo storage position;
- the retention device is a retractable belt;
- the retractable belt is selectively releasable from a retraction mechanism disposed on at least one of the first and second sides of the seat; and
- the retractable belt is selectively releasable from a retraction mechanism disposed on one of the first or second sides of the seat and attachable to an opposing first or second side of the seat.

According to a second aspect of the present invention, a vehicle seating assembly includes a selectively positionable seat. A selectively positionable retention device is positionable in a seating position or a stadium position. The selectively positionable retention device is coupled to the selectively positionable seat and selectively arrangeable in at least one of a stored position and a cargo storage position.

Embodiments of the second aspect of the invention can include any one or a combination of the following features:
- a tray disposed on a floor, wherein the tray is disposed below the retention device when the retention device is in the cargo storage position, and wherein the tray, the retention device in the cargo storage position, and the seat define an enclosure;
- the seat in the stadium position at least partially defines the enclosure; and
- the tray includes a raised edge disposed around a perimeter portion of the tray.

According to a third aspect of the present invention, a vehicle storage system includes a seating assembly. A seat is positionable in a seating position or a stadium position and includes a first surface and a second surface. A retention device is positionable in a stored position or a cargo storage position. The first surface includes a seating surface. When the retention device is in the cargo storage position, the retention device is configured to extend from opposing sides of the seat to secure cargo to the second surface of the seat.

Embodiments of the third aspect of the invention can include any one or a combination of the following features:
- the retention device includes first and second sides, wherein the first and second sides are coupled to the seat, and wherein the retention device is pivotable about an axis extending between the first and second sides and through the seat.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a perspective view of a seating assembly with a seat in the stadium position and a retention device in the stored position;

FIG. 4 is a perspective view of a seating assembly with a seat in the stadium position and a retention device in the cargo storage position;

FIG. 4A is a perspective view of a seating assembly with a seat in the stadium position and a retention device in the cargo storage position;

FIG. 8 is a partial perspective view of a seating assembly with a seat in the stadium position and a retention device;

FIG. 8A is a partial perspective view of a seating assembly with the seat in the stadium position and a retention device;

FIG. 10 is a partial perspective view of a seating assembly with a seat in the stadium position and a retention device;

FIG. 10A is a partial perspective view of a seating assembly with a seat in the stadium position and a retention device;

FIG. 11 is a left side elevational view of a seating assembly of FIG. 7 with a seat in the seating position and a retention device in a cargo storage position;

DETAILED DESCRIPTION

It is to be understood that variations and modifications can be made on the aforementioned structure without departing from the concepts of the present invention, and further it is to be understood that such concepts are intended to be covered by the following claims unless these claims by their language expressly state otherwise.

Figure 1:
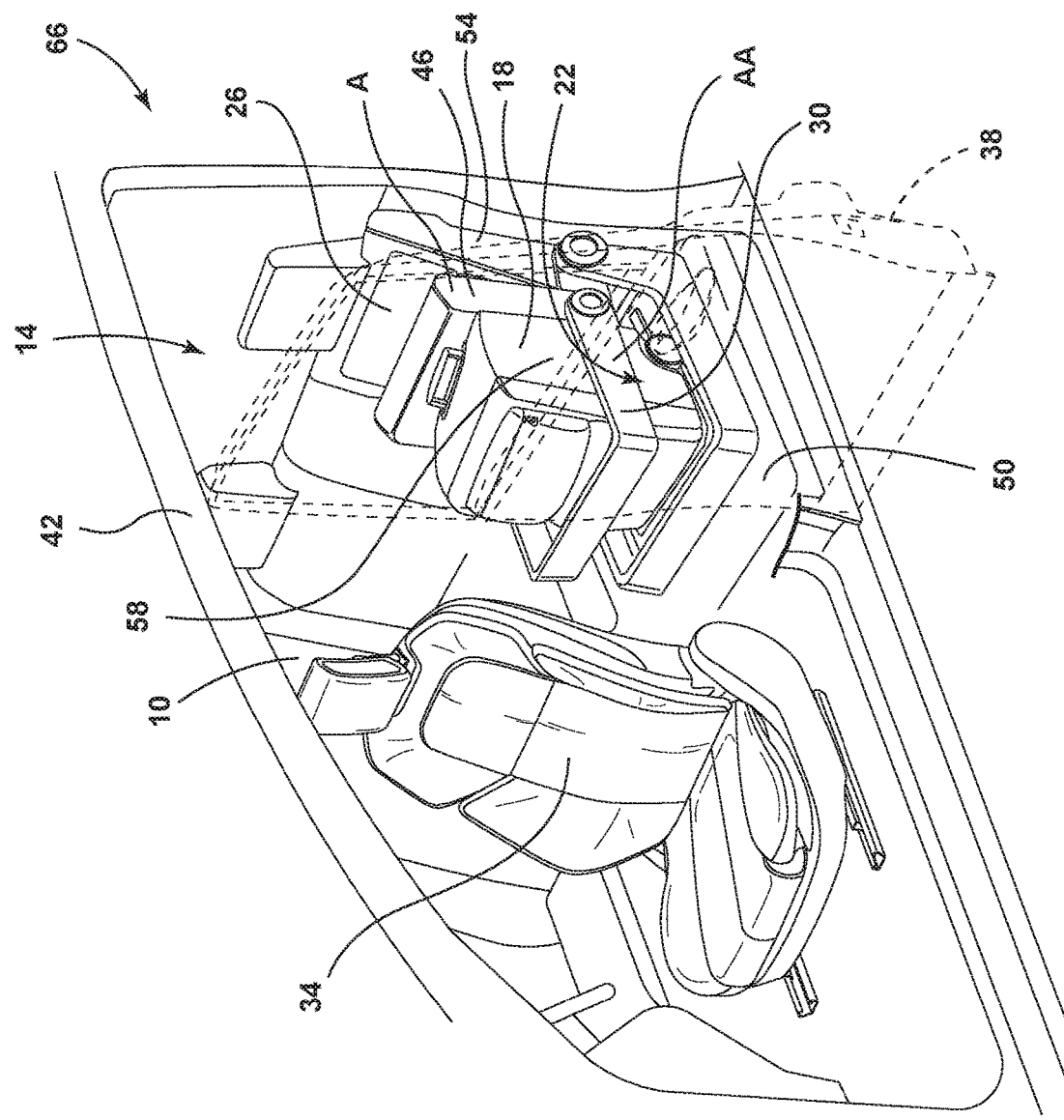
FIG. 1 is a perspective view of the vehicle interior with a seating assembly in a stadium position and a retention device in a cargo storage position, according to an embodiment.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary aspects of the inventive concepts defined in the appended claims. Hence, specific dimensions and other physical characteristics relating to the aspects disclosed herein are not to be considered as limiting, unless the claims expressly state otherwise.

Referring to FIG. 1, a passenger compartment 10 of a vehicle interior 14 is shown. A luggage piece 18 is shown in a cargo storage area 22 within the passenger compartment 10. The cargo storage area 22 may be defined by at least a seating assembly 26 with retention device 30. The seating assembly 26 with retention device 30 is shown behind the seating assembly 34 of the driver. The location of the cargo storage area 22 behind the seating assembly 34 of the driver allows for convenient access to the cargo storage area 22 through a rear door 38 of the vehicle 42. The seat 46 is shown in the stadium position A, and the retention device 30 is shown in the cargo storage position AA.

Referring to FIGS. 1-13, a vehicle 42 includes a floor 50. A seating assembly 26 is attached to the floor 50. The seating assembly 26 includes a seat 46 that is rotationally operable relative to a seatback 54. A retention device 30 is attached to the seat 46. When the seat 46 is pivoted upright to a stadium position A, the retention device 30 is selectively deployable from a stored position BB to a cargo storage position AA. The seat 46 in the stadium position A and the retention device 30 in the cargo storage position AA define an enclosure 58 at least partially defined by the seat 46 and the floor 50.

Referring again to FIGS. 1-13, a vehicle storage system 66 includes a seating assembly 26. The seating assembly 26 includes a seat 46 positionable in a seating position B or a stadium position A. The seat 46 includes a first surface 70 and a second surface 74. The seating assembly 26 includes a retention device 30 positionable in a stored position BB or a cargo storage position AA. The first surface 70 of the seat 46 includes a seating surface 72. When the retention device 30 may be in the cargo storage position AA, then the retention device 30 may be configured to extend from opposing sides (first side 78, second side 82) of the seat 46 to secure the cargo (for example, luggage piece 18) to the second surface 74 of the seat 46.

In the stored position BB, the retention device 30 may be integrated with the seat 46. In the stored position BB, the retention device 30 may surround the seat 46 (for example, bracket 30a may surround the perimeter portion 146 of the seat 46 in FIGS. 2, 3, 13). In the stored position BB, the retention device 30 may be disposed within the seat 46 (for example, strap 30b may be stored in the seat 46 in FIGS. 8A, 9A, and 10A).

With reference again to FIG. 1, in certain conditions, it may be desirable to store cargo securely within a passenger compartment 10 of a vehicle interior 14. Users may want their cargo to be maintained in one location during standard driving conditions, erratic driving conditions, and dynamic events such as collisions. Minimally secured cargo may move within a passenger compartment 10 of a vehicle interior 14. During dynamic events (such as erratic driving conditions and vehicle collisions), passengers and cargo may unintentionally interact or make contact. Accordingly, providing a retention device 30 that is selectively deployable to form an enclosure 58 as generally set forth in FIGS. 1-13 may provide a generally confined space for cargo and thus may provide a safer, more pleasant traveling experience for a vehicle occupant.

Figure 2:
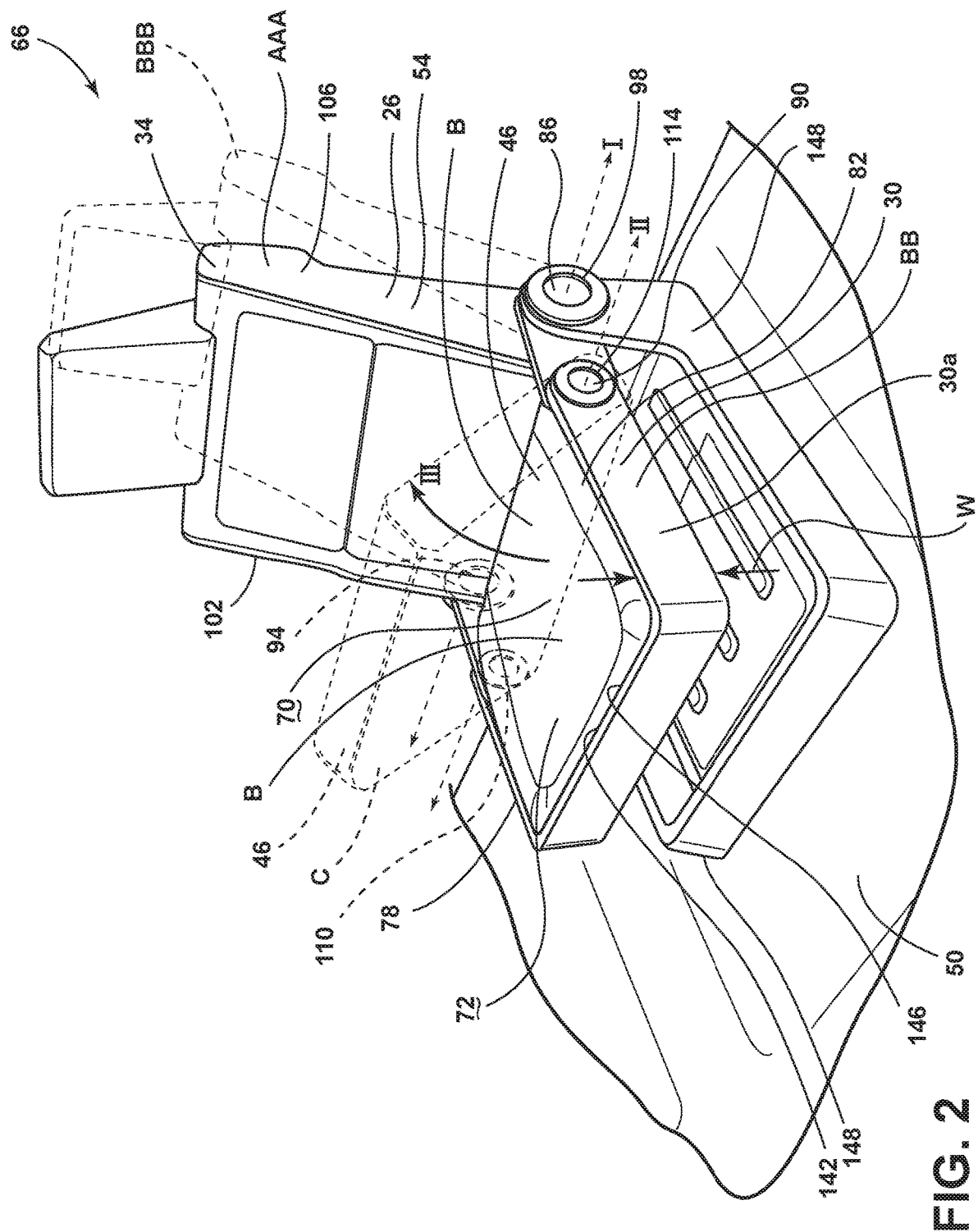
FIG. 2 is a perspective view of a seating assembly with a seat in the seating position and a retention device in the stored position.

Referring now to FIG. 2, the seating assembly 26 may include a seat 46 and a seatback 54. The seating assembly 26 is shown with the seat 46 in a seating position B. The seating position B may also be referred to as a substantially horizontal position of the seat 46. The seatback 54 is shown in the substantially vertical position AAA. The retention device 30 is shown in the stored position BB. The seating assembly 26 may be coupled to the floor 50. The seating assembly 26 may include a first pivot point 86 and a second pivot point 90. The seatback 54 may pivot about the first axis I extending through a first pivot point 86. The seat 46 and the retention device 30 may pivot about the second axis II extending through a second pivot point 90. The seat 46 and the retention device 30 may pivot about a second axis II separately or together. The seat 46 may be rotated in the direction shown by arrow III from the seating position B (FIG. 2) to the stadium position A (FIG. 3). The retention device 30 may be rotated in the direction shown by arrow III from the substantially horizontal cargo storage position AA (FIG. 1) to the substantially vertical stored position BB (FIG. 3).

With continued reference to FIG. 2, the first axis I may extend through a first attachment location 94 disposed on a first side 102 of the seatback 54 and a second attachment location 98 disposed on a second side 106 of the seatback 54. A second axis II of rotation may extend though a first attachment point 110 disposed on the first side 78 of the seat 46 and a second attachment point 114 disposed on a second side 82 of the seat 46.

Figure 2A:
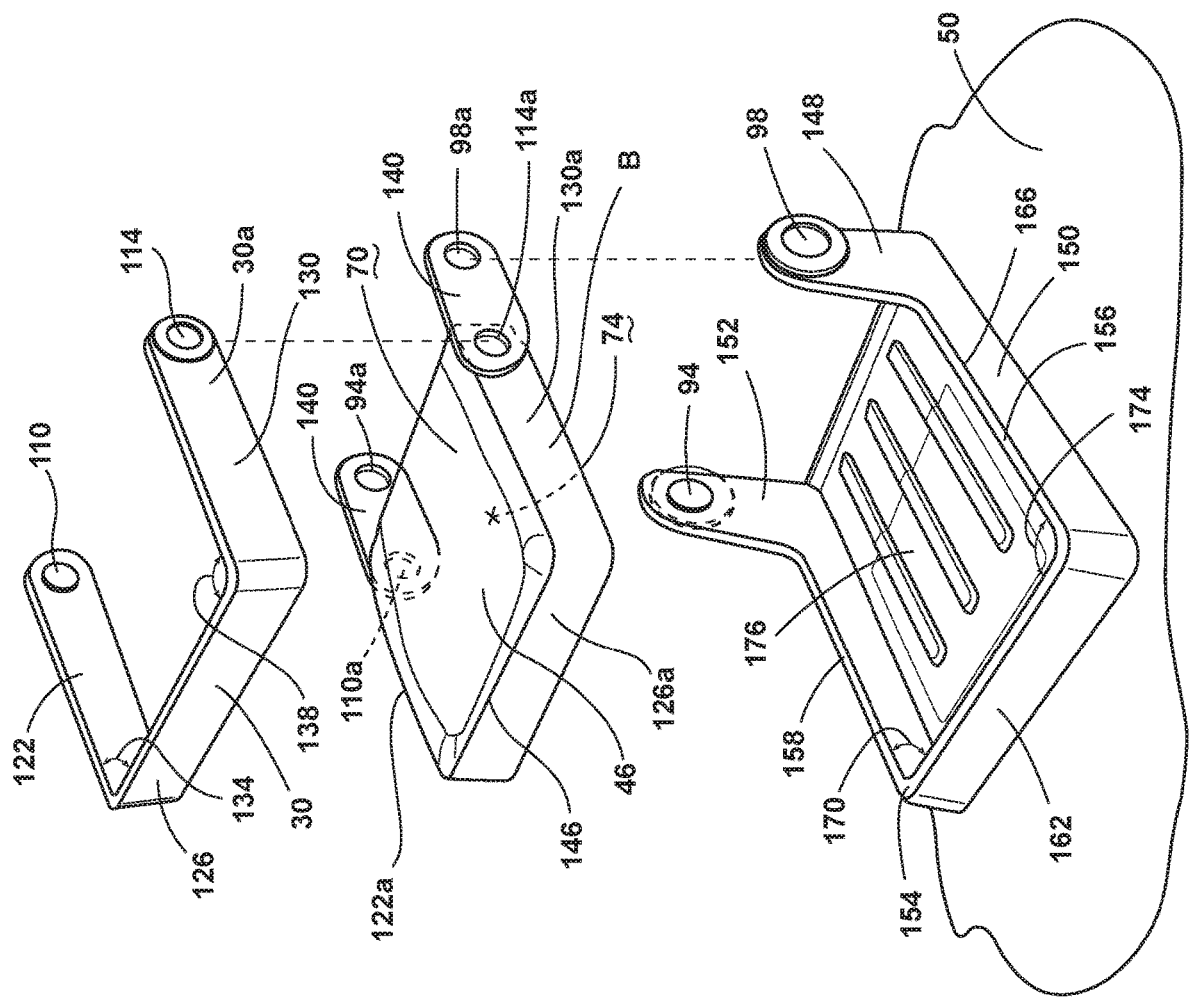
FIG. 2A is an exploded view of the retention device, the seat, and the tray of FIG. 2.

With reference to FIG. 2A, exploded views of the retention device 30, the seat 46, and the tray 148 of FIG. 2 are shown. The retention device 30 may include a bracket 30a. The bracket 30a may include a first side 122, a second side 126, and a third side 130. The first side 122 of the bracket 30a may extend outward from the first attachment point 110. A second side 126 of the bracket 30a may be substantially transverse to the first side 122 of the bracket 30a. A first bend angle 134 may be disposed between the first side 122 of the bracket 30a and the second side 126 of the bracket 30a. The first bend angle 134 may be approximately 90 degrees. A third side 130 of the bracket 30a may be transverse to a second side 126 of the bracket 30a. A second bend angle 138 may be disposed between the second side 126 of the bracket 30a and the third side 130 of the bracket 30a. The second bend angle 138 may be approximately 90 degrees. The third side 130 of the bracket 30a may extend away from the second attachment point 114. The first side 122 of the bracket 30a may be substantially parallel to the third side 130 of the bracket 30a.

With continued reference to FIG. 2A, an interference fit 142 (FIG. 2) may exist between the bracket 30a and the perimeter portion 146 of the seat 46 when the bracket 30a is in the stored position BB. In the stored positon BB, the bracket 30a may be integrated with the seat 46, and an interference fit 142 (FIG. 2) may be formed between the seat 46 and the bracket 30a. The bracket 30a may be disposed around a seat 46 when the seat 46 is in the seating position B, the stadium position A, intermediary positions C (FIG. 2) between the seating position B and the stadium position A, and positions beyond the seating position B and the stadium position A.

Referring again to FIG. 2A, the perimeter portion 146 of the seat 46 may include a first side 122a, a second side 126a, and a third side 130a. The bracket 30a may be made of a metal, a composite, or other suitable material. The bracket 30a may be designed to rotate about the first and second attachment points 110, 114. In various examples, the bracket 30a may have various widths W. In various examples, the bracket 30a may be made of one or more parts. In various examples, the bracket 30a may be positioned in various areas of the seat 46 in the stored position BB. In one example, the bracket 30a may be disposed within the cushion of the seat 46 and accessible from the bottom surface (second surface 74) of the seat 46.

Referring again to FIG. 2A, connectors 140 may secure the bracket 30a to the tray 148. The first attachment point 110 of the bracket 30a and the second attachment point 114 of the bracket 30a may be coupled to the connectors 140 at respective bracket apertures 110a and 114a. The first attachment location 94 of the base portion 152 of the tray 148 and the second attachment location 98 of the base portion 152 of the tray 148 may be coupled to the connectors 140 at respective bracket apertures 94a and 98a.

With continued reference to FIG. 2A, a tray 148 may be disposed on a floor 50 below the seat 46 in the seating position B. The tray 148 may include a floor portion 150 and a base portion 152. The floor portion 150 of the tray 148 may be configured to extend below the seat 46 in the seating position B. The base portion 152 of the tray 148 may extend away from the floor portion 150. The base portion 152 may include the first attachment location 94 and the second attachment location 98. The first attachment location 94 and the second attachment location 98 may provide a location for the seatback 54 to be rotationally coupled to the base portion 152 of the tray 148. The first attachment location 94 and the second attachment location 98 may receive a respective first rotary locking mechanism and a respective second rotary locking mechanism. The first rotary locking mechanism and the second rotary locking mechanism may be positionable to orient the seatback 54 in various positions (for example, in position BBB, reclined approximately 30° from the substantially vertical position AAA). A user may recline the seatback 54 to a reclined position for sleeping (for example, position BBB).

Referring again to FIG. 2A, the tray 148 may include a raised edge 154 disposed about a perimeter portion 156 of the tray 148. The raised edge 154 may include a first edge portion 158, a second edge portion 162, and a third edge portion 166. The first edge portion 158 of the tray 148 may extend away from the base portion 152 of the tray 148. The second edge portion 162 of the tray 148 may be substantially transverse to the first edge portion 158 of the tray 148. A first bend angle 170 may be disposed between the first edge portion 158 of the tray 148 and the second edge portion 162 of the tray 148. The first bend angle 170 may be approximately 90 degrees. A third edge portion 166 of the tray 148 may be transverse to a second edge portion 162 of the tray 148. A second bend angle 174 may be disposed between the second edge portion 162 of the tray 148 and the third edge portion 166 of the tray 148. The second bend angle 174 may be approximately 90 degrees. The third edge portion 166 of the tray 148 may extend away from the base portion 152 of the tray 148. The first edge portion 158 of the tray 148 may be substantially parallel to the third edge portion 166 of the tray 148. As such, the tray 148 may include features that maintain cargo in a depression 176 in the tray 148. The depression 176 may be defined by at least the first edge portion 158, the second edge portion 162, and the third edge portion 166 of the tray 148.

Referring now to FIG. 3, the seating assembly 26 is shown with the seat 46 in the stadium position A and the bracket 30a in the stored position BB. A luggage piece 18 may be disposed in the depression 176 in the tray 148. In various examples, a lock 178 may hold the seat 46 in the stadium position A.

Referring now to FIG. 4, the seating assembly 26 is shown with the seat 46 in the stadium position A and the bracket 30a in the cargo storage position AA. A user may rotate the bracket 30a from a substantially vertical stored position BB (FIG. 3) to the cargo storage position AA (FIG. 4) in the direction shown by arrow IV. The bracket 30a may be rotated from the cargo storage position AA (FIG. 4) to the substantially vertical stored position BB (FIG. 3) in the direction shown by arrow III. A luggage piece 18 is shown in the enclosure 58 defined by the seat 46, the bracket 30a, and the tray 148.

In various examples, a retention device 30 may be deployed on demand. In various examples, a retention device 30 may be manually or automatically activated to retain cargo (for example, luggage piece 18) in a cargo storage area 22. In one example, a button 182 disposed on the seat 46 may be pushed to deploy the retention device 30. In various examples, the latching system of a retention device 30 may include a presence detection feature to detect when the cargo (including luggage) is properly secured. In various examples, a retention device 30 may be self-retracting. In various examples, the retention device 30 may include an inertial locking feature that allows for adjustment or access. In various examples, the inertial locking feature may lock and secure stowed items when required under predetermined dynamic loads.

With reference to FIG. 4, the seat module 186 may be coupled to the seating assembly 26. The seat module 186 may include inputs 190. The inputs 190 may include a bracket position 194a, a presence detector 198, and a lock setting 202. The inputs 190 may be coupled to a controller 206. A controller 206 may include a memory 210 and a processor 214. The processor 214 may include a control routine 218. The controller 206 may be connected to outputs 222. The outputs 222 may include a bracket adjuster 226a and a lock adjuster 228. As such, the seat module 186 may be programmed to automatically configure the seat 46 and the bracket 30a into an enclosure 58 for storing cargo. Also, a user may manually configure the seat 46 and the bracket 30a into an enclosure 58 for storing cargo.

Referring to FIG. 4A, another example of the vehicle storage system 66 of FIG. 4 is shown. The seating assembly 26 may be mounted to the floor 50. A first bracket 230 and a second bracket 232 may mount the seating assembly 26 to the floor 50. An enclosure 58 may be defined by the seat 46, the bracket 30a, and the floor 50.

Figure 5:
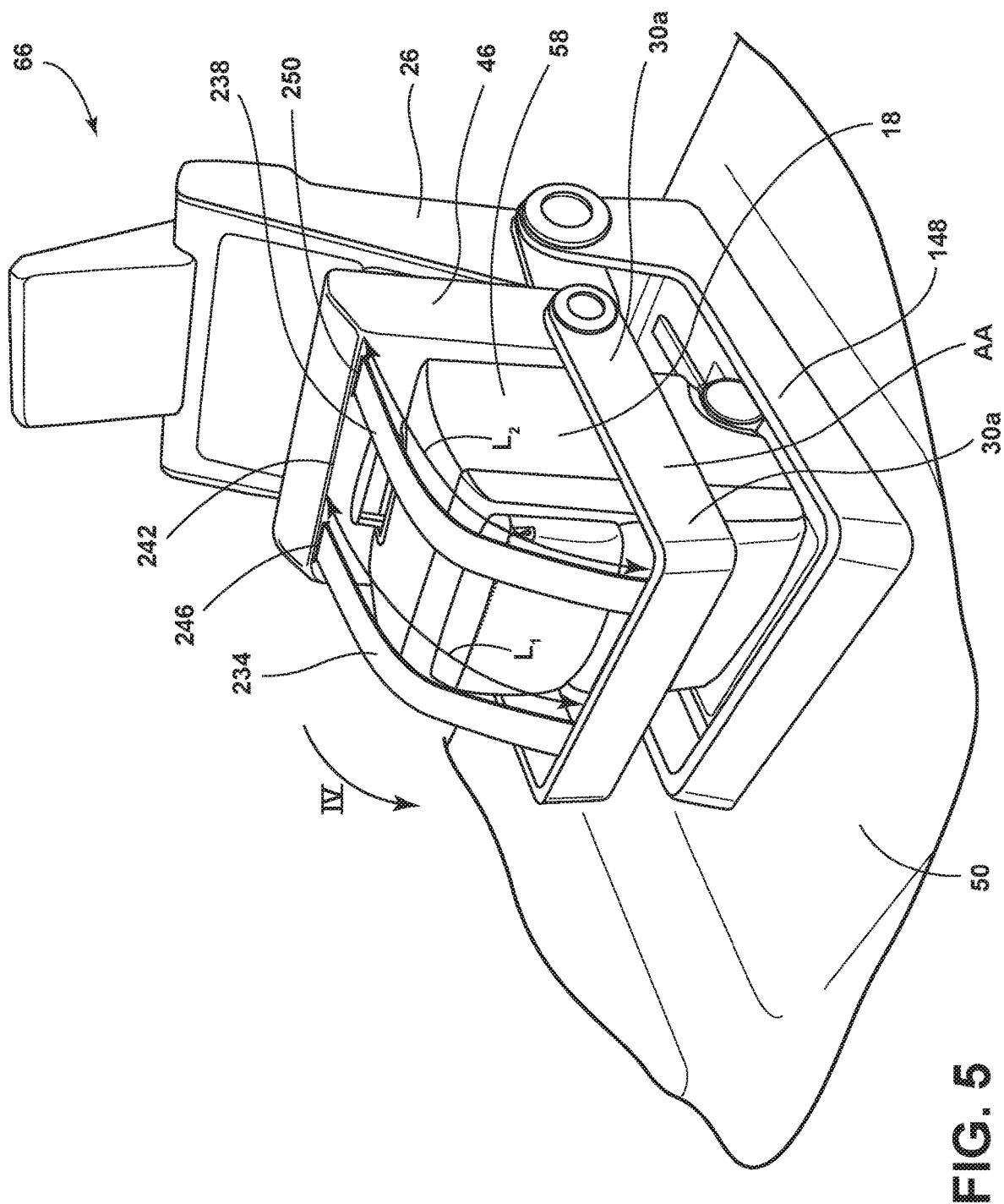
FIG. 5 is a perspective view of a seating assembly with a seat in the stadium position and a retention device in the cargo storage position.

With reference now to FIG. 5, a version of the seating assembly 26 of FIG. 4 is shown with first and second straps 234, 238 extending between an edge area 242 of the seat 46 and the bracket 30a. The first and second straps 234, 238 may extend from respective first and second retraction mechanisms 246, 250 disposed in an edge area 242 of the seat 46. As the bracket 30a is rotated from the substantially vertical stored position BB (FIG. 3) to the cargo storage position AA in the direction shown by arrow IV, the belt may spool out of the first and second retraction mechanisms 246, 250. When the bracket 30a is in the cargo storage configuration AA, the first and second retraction mechanisms 246, 250 may lock to maintain the first and second straps 234, 238 at fixed exposed lengths $L_1$, $L_2$. The fixed exposed lengths $L_1$, $L_2$ may be determined by the size of the cargo (luggage piece 18) disposed on the tray 148.

Figure 6:
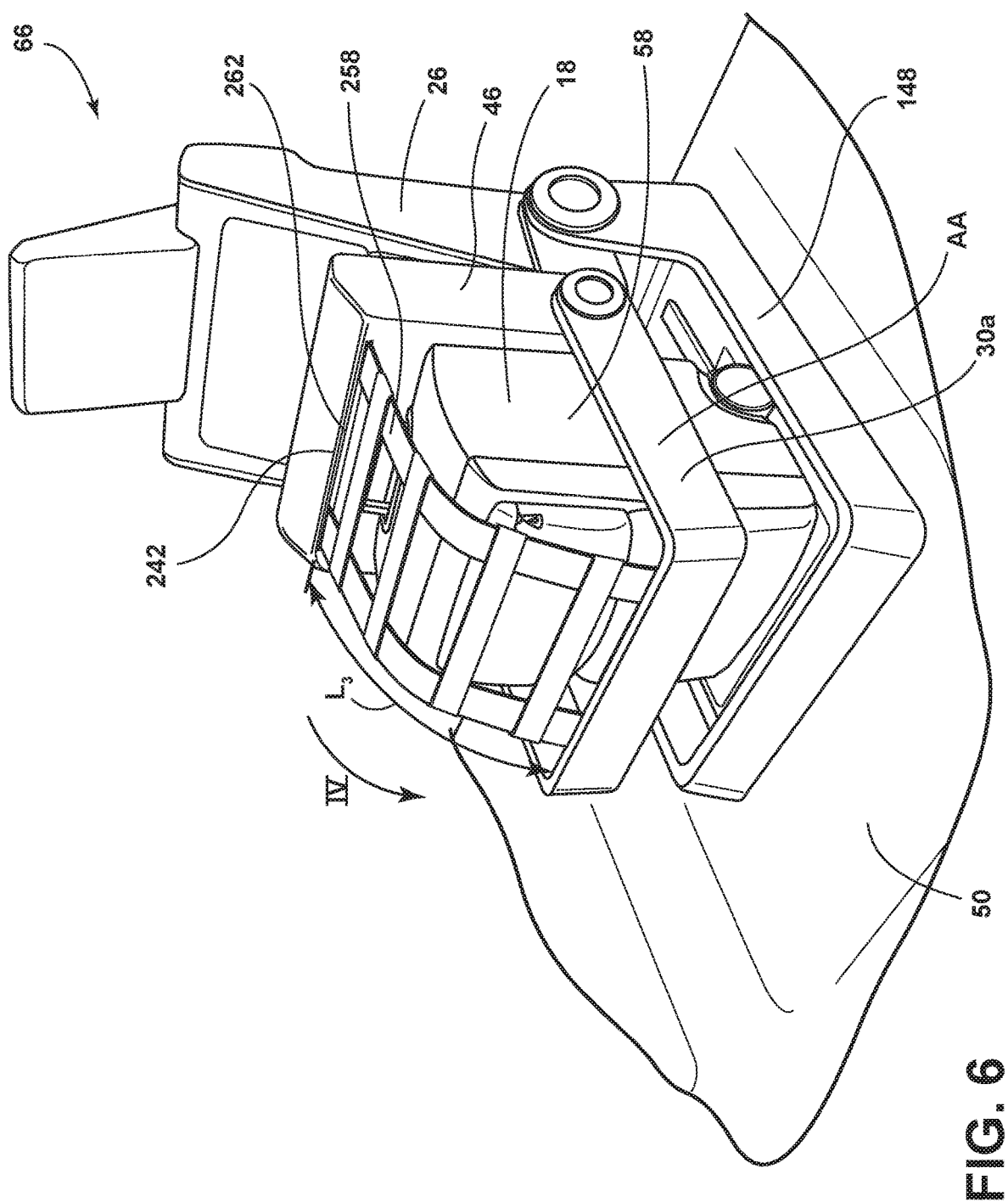
FIG. 6 is a perspective view of a seating assembly with a seat in the stadium position and a retention device in a cargo storage position.

With reference now to FIG. 6, an example of the seating assembly 26 of FIG. 4 is shown with a ladder-type belt 258. The ladder-type belt 258 may extend from the retraction mechanism 262 disposed in an edge area 242 of the seat 46. As the bracket 30a is rotated from a stored position BB (FIG. 3) to a cargo storage position AA in the direction shown by arrow IV, the retraction mechanism 262 may allow the ladder-type belt 258 to spool out from the retraction mechanism 262. When the bracket 30a is in the cargo storage position AA, the retraction mechanism 262 may lock to maintain the ladder-type belt 258 at a fixed exposed length $L_3$. The fixed exposed length $L_3$ may be determined by the size of the cargo (luggage piece 18) disposed on the tray 148.

Figure 7:
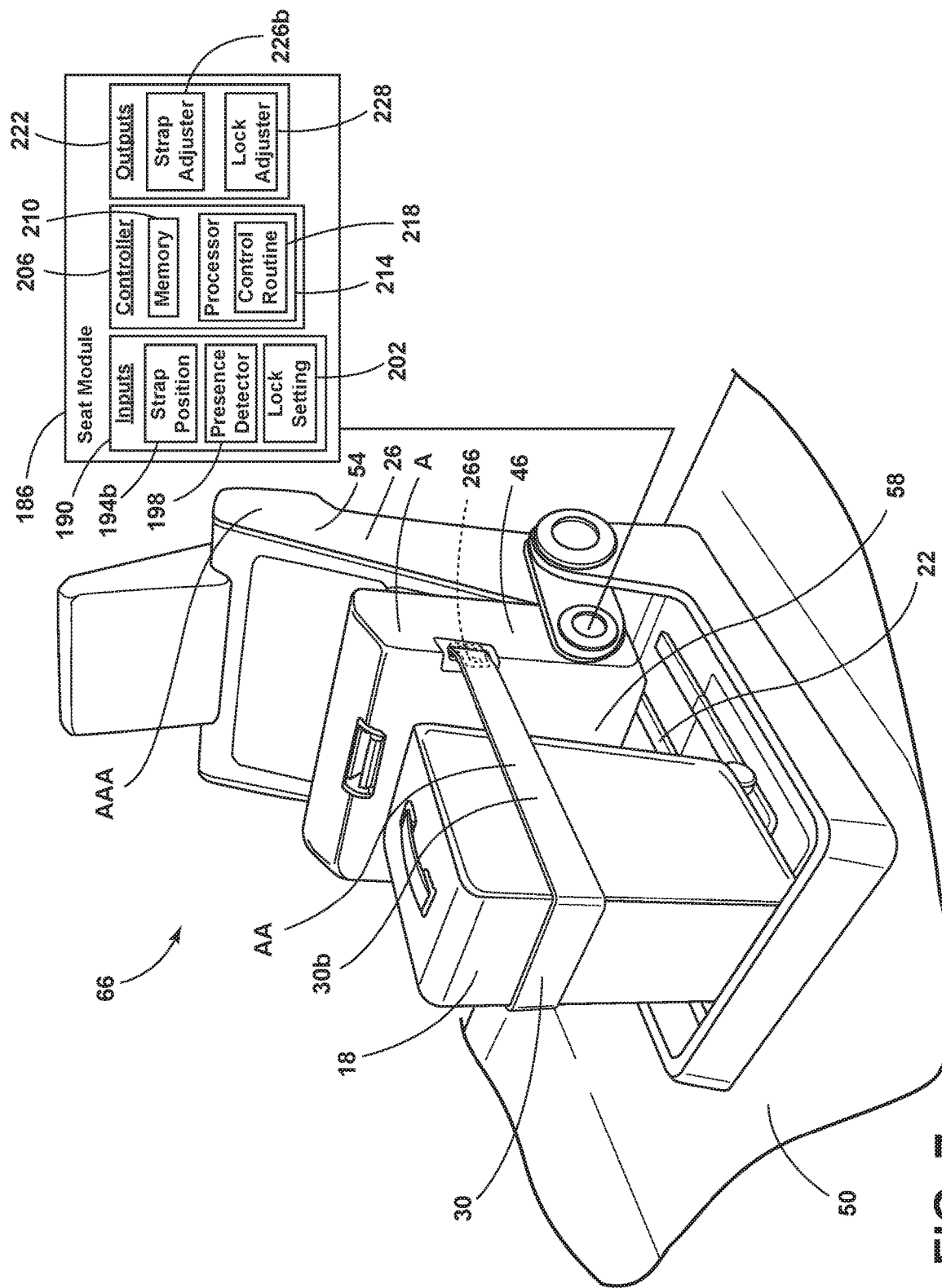
FIG. 7 is a perspective view of a seating assembly with a seat in the stadium position and a retention device in a cargo storage position, according to another embodiment.

Referring now to FIG. 7, an alternate embodiment of the seating assembly 26 with retention device 30 of FIGS. 1-6 is shown. In the alternate embodiment, the retention device 30 includes a strap 30b. The strap 30b may be selectively deployable from a stored position BB (FIGS. 8A, 9A, 10A) to a cargo storage position AA (FIG. 7). In the stored position BB, the strap 30b may be integral to the seat 46 (for example, the strap 30b may be spooled in a retraction mechanism in a seat (FIGS. 8A, 9A, 10A) or the strap may be stretched across a seat surface (FIG. 10A). The strap 30b in the cargo storage position AA may define an enclosure 58 at least partially defined by the seat 46 and the floor 50. The seating assembly 26 is shown with the seat 46 in the stadium position A. A strap 30b is shown extending around a luggage piece 18 disposed in the cargo storage area 22. The strap 30b may include at least one end that extends from a retraction mechanism 266 disposed on the seat 46.

The retraction mechanism 266 may be positioned in an unlocked, locked, or pre-tensioned position. When the retraction mechanism 266 is in the unlocked position, the strap 30b may spool in and out of the retraction mechanism. When the retraction mechanism is in the locked position, the strap 30b may have a fixed length. When the retraction mechanism is in the pre-tensioned position, the strap 30b may retract into the retraction mechanism by a predetermined amount.

With continued reference to FIG. 7, the seat module 186 (previously described and shown in FIGS. 4-4A) may be coupled to the seating assembly 26. The seat module 186 may include inputs 190. The inputs 190 may include a strap position 194b, a presence detector 198, and a lock setting 202. The inputs 190 may be coupled to a controller 206. A controller 206 may include a memory 210 and a processor 214. The processor 214 may include a control routine 218. The controller 206 may be connected to outputs 222. The outputs 222 may include a strap adjuster 226b and a lock adjuster 228. As such, the seat module 186 may be programmed to automatically configure the seat 46 and the strap 30b into an enclosure 58 for storing cargo. Also, a user may manually configure the seat 46 and the retention device 30 into an enclosure 58 for storing cargo.

Figure 7A:
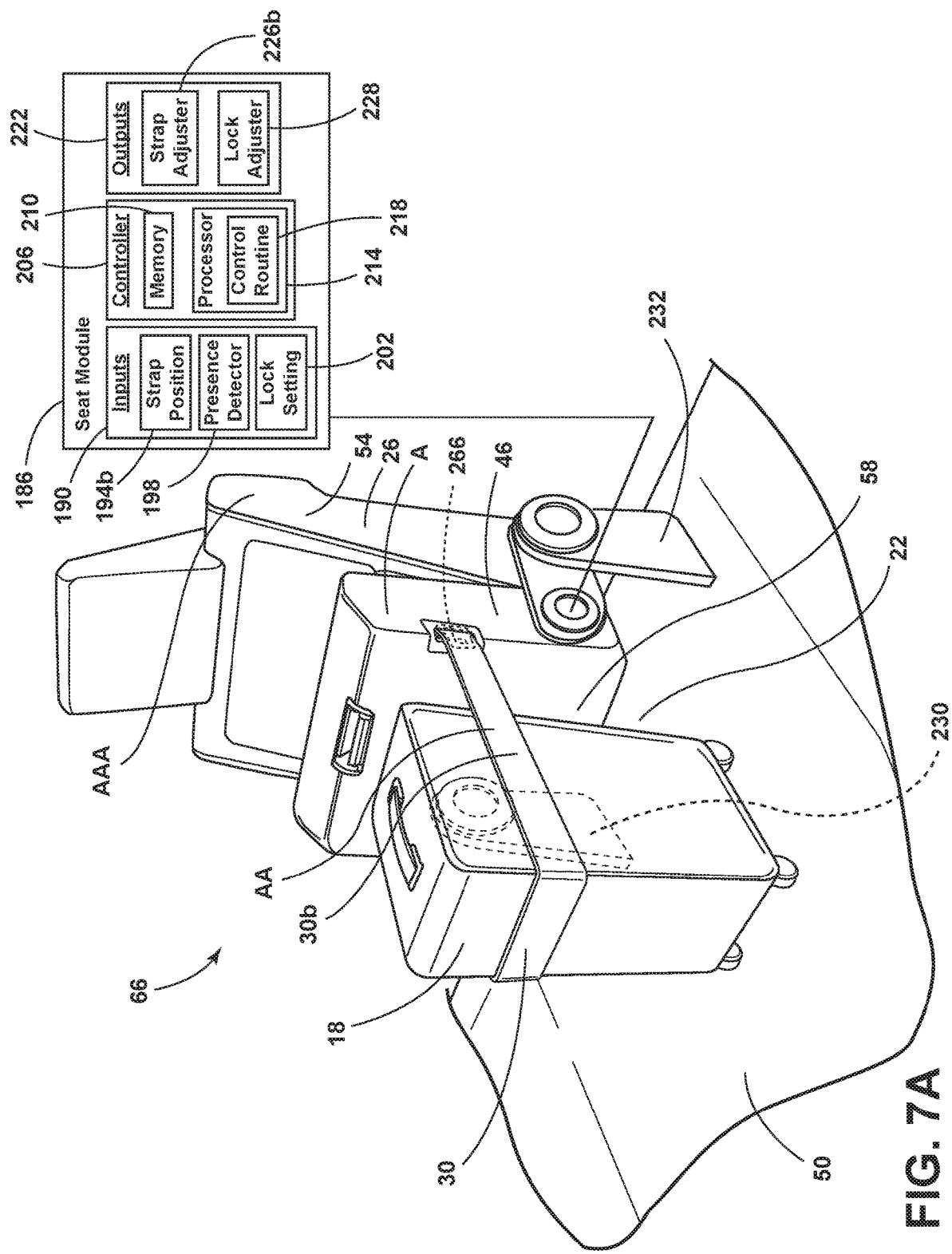
FIG. 7A is a perspective view of a seating assembly with a seat in the stadium position and a retention device in a cargo storage position, according to another embodiment.

Referring to FIG. 7A, another example of the vehicle storage system 66 of FIG. 7 is shown. The seating assembly 26 may be mounted to the floor 50. A first bracket 230 and a second bracket 232 may mount the seating assembly 26 to the floor 50. An enclosure 58 may be defined by the seat 46, the bracket 30a, and the floor 50.

Figure 9:
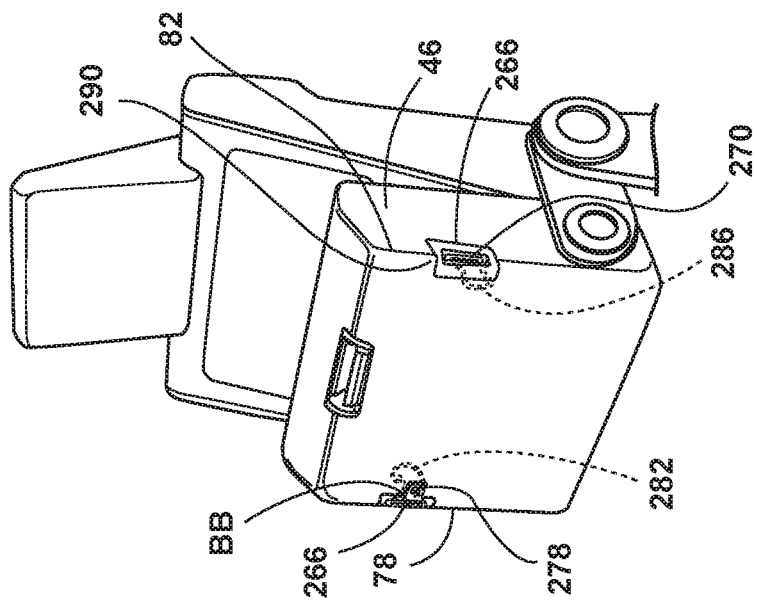
FIG. 9 is a partial perspective view of a seating assembly with a seat in the stadium position and a retention device.
Figure 9A:
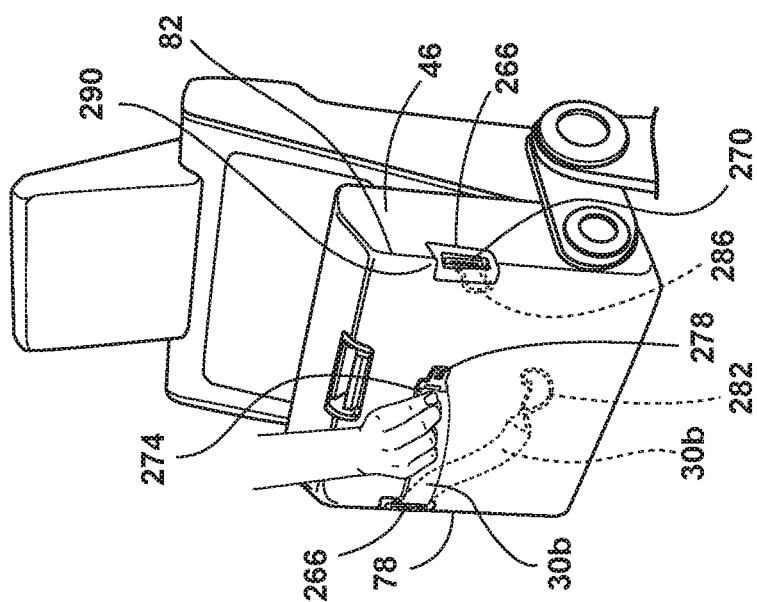
FIG. 9A is a partial perspective view of a seating assembly with the seat in the stadium position and a retention device.

Referring to FIGS. 8-10, various examples of the strap 30b are shown. With reference to FIG. 8, the strap 30b may be a belt that extends from a retraction mechanism 266 disposed on a second side 82 of a seat 46. A free end 274 of the belt may include a tongue 278. A slot 270 for receiving the tongue 278 may be disposed on the first side 78 of the seat 46. The slot 270 may include a latching striker integrated into the trim of the seat 46. The strap 30b may be designed to withstand heavy tensile and shear loads from the engaged tongue 278.

Referring to FIG. 9, the strap 30b may be a belt that extends from a retraction mechanism 266 disposed on a first side 78 of the seat 46. The strap 30b may include a tongue 278. A slot 270 for receiving the tongue 278 may be disposed on a second side 82 of the seat 46. In another example, the strap 30b may include a tether 282. A striker 286 for receiving the tether 282 may be disposed on a second side 82 of the seat 46. As discussed with respect to FIG. 8, the slot 270 for receiving the tongue 278 may include a latching striker integrated into the trim of the seat 46. The strap 30b may be designed to withstand heavy tensile and shear loads from the engaged tongue 278. Similarly, the striker 286 for receiving the tether 282 may be disposed in the trim of the seat 46 or in the slot 270. The strap 30b may be designed to withstand heavy tensile and shear loads from the engaged tether 282.

Referring to FIG. 10, in another example, the strap 30b may extend from a first retraction mechanism 266a disposed on a first side 78 of the seat 46 and a second retraction mechanism 266b disposed on a second side 82 of the seat 46. The strap 30b may include a first portion 298 that extends from a first side 78 of the seat 46. The free end 274 of the first portion 298 of the strap 30b may include a tongue 278. The strap 30b may include a second portion 302 that extends from a second retraction mechanism 266b disposed on a second side 82 of the seat 46. The free end 274 of the second portion 302 of the strap 30b may include a slot 306 for receiving the tongue 278. The slot 306 for receiving the tongue 278 may include a latching mechanism.

Referring to FIG. 11, the seating assembly 26 is shown with the seat 46 in the seating position B. Cargo (item 310)

is shown stored under the seat 46. The strap 30b may be in the cargo storage position AA. The strap 30b may retain the cargo under the seat 46.

Figure 12:
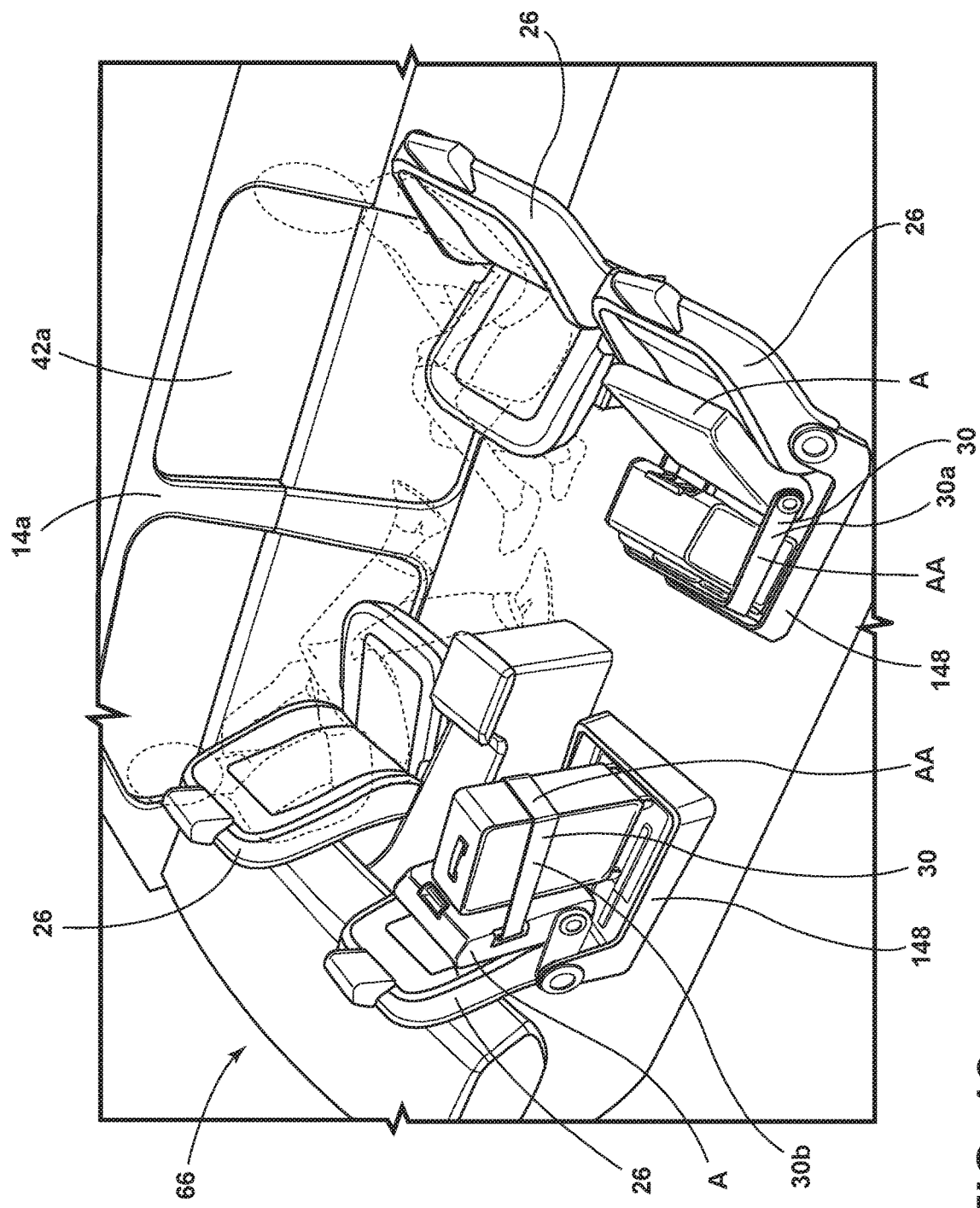
FIG. 12 is a perspective view of a vehicle interior with seating assemblies in stadium positions and retention devices in cargo storage positions.

Referring to FIG. 12, a vehicle interior 14a is shown with the seating assemblies 26. The seating assemblies 26 may include retention devices 30 in a cargo storage position AA. The seating assemblies 26 may include a bracket 30a disposed in a cargo storage position AA. The seating assemblies 26 may include a strap 30b disposed in the cargo storage position AA. Trays 148 may be disposed below the seating assemblies 26.

Figure 13:
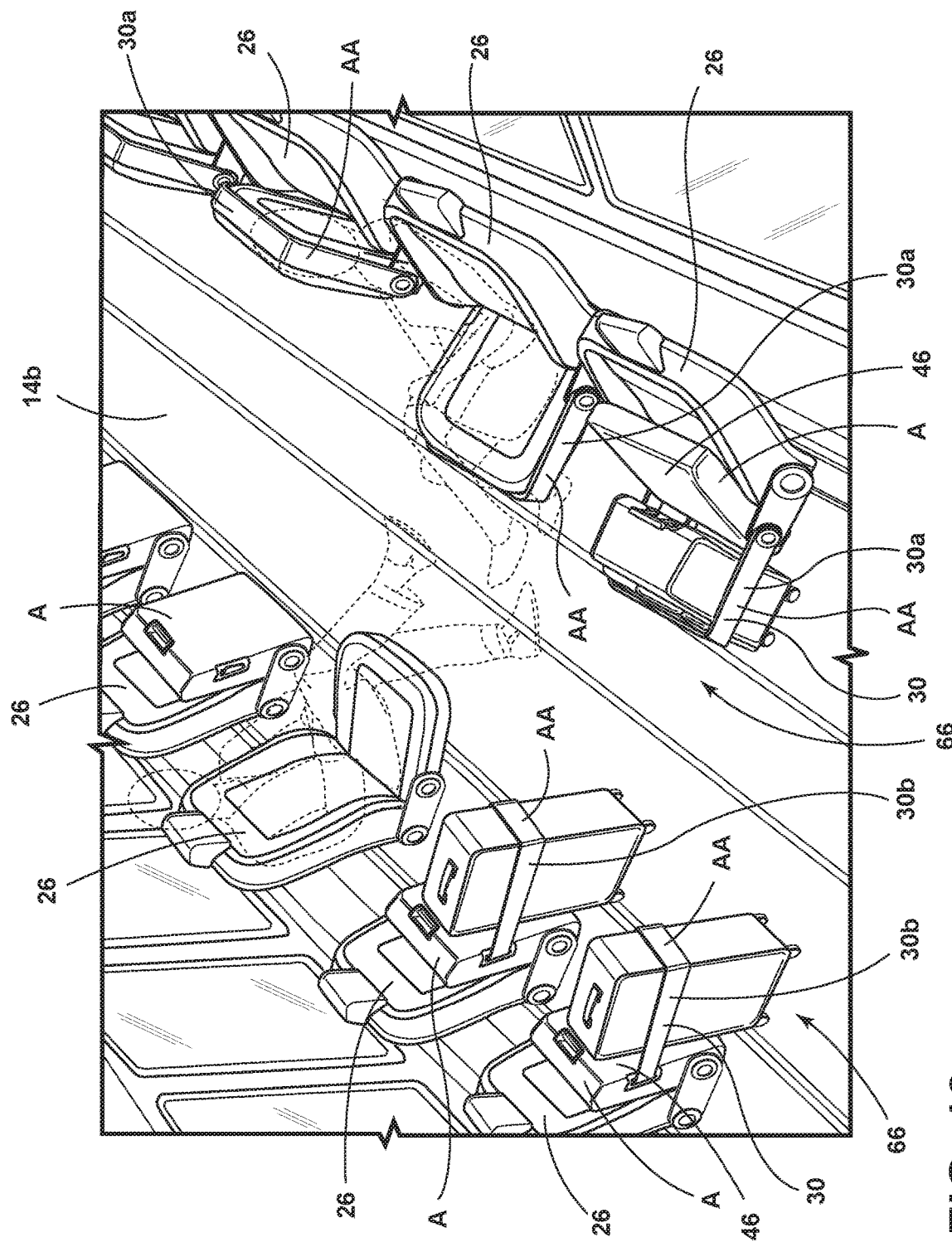
FIG. 13 is a perspective view of a vehicle interior with seating assemblies in stadium positions and retention devices in cargo storage positions.

Referring now to FIG. 13, a vehicle interior 14b is shown with seating assemblies 26. Seating assemblies 26 may include seats 46 in stadium positions A and retention devices 30 in cargo storage positions AA. Seating assemblies 26 may include seats 46 in stadium positions A and brackets 30a in the cargo storage position AA. Seating assemblies 26 may include seats 46 in stadium positions A and straps 30b in cargo storage positions AA.

A variety of advantages may be derived from use of the present disclosure. The seating assembly with retention device may allow for simple, economical storage of luggage in a passenger compartment of a vehicle interior in a secure manner. The seating assembly with retention device may utilize an existing seat structure with limited incremental content to create a new and useful cargo (including luggage) management system. The seating assembly with retention device may be applied to various vehicle interiors. The seating assembly with retention device may be used with conventional and non-conventional seating configurations. The seating assembly with retention device may limit the movement of cargo within the passenger compartment of the vehicle interior during standard driving conditions, erratic driving conditions, and dynamic events such as vehicle collisions.

It is to be understood that variations and modifications can be made on the afore-mentioned structure without departing from the concepts of the present disclosure, and further it is to be understood that such concepts are intended to be covered by the following claims unless these claims by their language expressly state otherwise.

What is claimed is:

1. A vehicle comprising:
a floor;
a seating assembly attached to the floor and including a seat that is rotationally operable relative to a seatback; and
a retention device attached to the seat, wherein when the seat is pivoted upright to a stadium position the retention device is selectively deployable from a stored position to a cargo storage position that defines an enclosure at least partially defined by the seat and the floor, wherein the retention device is pivotably coupled to the seat at a first attachment point and a second attachment point, wherein the retention device comprises a bracket including a first side extending away from the first attachment point and a second side extending away from the second attachment point, wherein the bracket includes a third side extending between the first side and the second side, and further comprising a strap extending between the third side of the bracket and the seat when the bracket is in a cargo storage position and when the seat is in the stadium position.

2. The vehicle of claim 1, further comprising:
a retraction mechanism disposed in the seat for receiving the strap when the retention device is in the stored position.

3. The vehicle of claim 1, wherein the strap comprises a first strap and a second strap.

4. The vehicle of claim 1, wherein the strap comprises a ladder-type shape.

5. The vehicle of claim 1, wherein the bracket is disposed about a perimeter portion of the seat when the bracket is in the stored position.

6. The vehicle of claim 1, wherein the retention device is stored in a first side of the seat in a stored position.

7. The vehicle of claim 6, wherein the retention device extends from the first side of the seat to a second side of the seat in a cargo storage position.

8. The vehicle of claim 7, wherein the retention device is a retractable belt.

9. The vehicle of claim 8, wherein the retractable belt is selectively releasable from a retraction mechanism disposed on at least one of the first and second sides of the seat.

10. The vehicle of claim 8, wherein the retractable belt is selectively releasable from a retraction mechanism disposed on one of the first or second sides of the seat and attachable to an opposing first or second side of the seat.

11. A vehicle seating assembly comprising:
a selectively positionable seat; and
a selectively positionable retention device that is positionable in a seating position or a stadium position, wherein the selectively positionable retention device is coupled to the selectively positionable seat and selectively arrangeable in at least one of a stored position and a cargo storage position; and
a tray disposed on a floor, wherein the tray is disposed below the retention device when the retention device is in the cargo storage position, and wherein the tray, the retention device in the cargo storage position, and the seat define an enclosure.

12. The vehicle seating assembly of claim 11, wherein the seat in the stadium position at least partially defines the enclosure.

13. The vehicle seating assembly of claim 11, wherein the tray includes a raised edge disposed around a perimeter portion of the tray.

14. A vehicle storage system comprising:
a seating assembly including:
a seatback rotatable about a first axis of rotation;
a seat rotatable about a second axis of rotation between a seating position and a stadium position and having:
a first surface; and
a second surface; and
a retention device rotatable about the second axis of rotation between a stored position and a cargo storage position, wherein the first surface includes a seating surface, and wherein when the retention device is in the cargo storage position, the retention device is configured to extend from opposing sides of the seat to secure cargo to the second surface of the seat.

15. The vehicle storage system of claim 14, wherein the retention device includes a bracket having first, second, and third sides positionable around first, second, and third sides of the seat, and wherein the first, second, and third sides of the bracket include a substantially constant width.

16. The vehicle storage system of claim 14, wherein the retention device includes a bracket disposable in a cushion of the seat and accessible through a bottom portion of the seat.

17. The vehicle storage system of claim 14, further comprising:
   a connector extending between the seat and the seatback, wherein the seatback is rotationally coupled to the connector at the first axis of rotation and wherein the seat and the retention device are each rotationally coupled to the connector at the second axis of rotation.

18. The vehicle storage system of claim 17, wherein the connector and the retention device are both in a substantially horizontal orientation when the retention device is in the cargo storage position.

19. The vehicle storage system of claim 17, further comprising:
   a tray coupled to the connector.

20. The vehicle storage system of claim 14, further comprising:
   a tray disposed between the seat in the seating position and a vehicle floor.

\* \* \* \* \*